United States Patent

Lyon et al.

[11] 3,903,464
[45] Sept. 2, 1975

[54] BRAKING DEVICE FOR AIRCRAFT GYROSCOPE

[76] Inventors: Edwin B. Lyon, 3304 Devon Rd., Durham, N.C. 27707; Jeff R. Bailey, 116 Meadow Ln., Midwest City, Okla. 73110

[22] Filed: July 26, 1974

[21] Appl. No.: 492,076

[52] U.S. Cl. ............................... 318/212; 318/377
[51] Int. Cl.² .................................... H02P 3/20
[58] Field of Search ............ 318/211, 212, 375, 377

[56] References Cited
UNITED STATES PATENTS

| | | | |
|---|---|---|---|
| 3,011,112 | 11/1961 | Mowery | 318/212 |
| 3,313,992 | 4/1967 | Bohn | 318/212 |
| 3,708,734 | 1/1973 | Rowe | 318/212 |

*Primary Examiner*—G. Z. Rubinson
*Attorney, Agent, or Firm*—Joseph E. Rusz; Willard R. Matthews, Jr.

[57] ABSTRACT

The invention provides means for electronically braking gyroscope rotation and for reducing the normal unbraked rundown time of an aircraft's gyroscope driving motor. The devices disclosed provide for temporary application of DC current from the aircraft battery to the stator of the gyroscope drive motor. This is automatically accomplished with a fail safe circuit which connects one polarity DC voltage from the aircraft battery to two of the three phase windings of the gyroscope drive motor stator and the other polarity of DC voltage to the third winding. A direct current produced magnetic field is thus set up in the stator windings. The spinning rotor (during rundown) interacts with the magnetic field in accordance with Lenz's Law and dynamic braking of the gyroscope is accomplished.

1 Claim, 2 Drawing Figures

PATENTED SEP 2 1975　　　　　　　　　　　　　　　　　3,903,464

BRAKING DEVICE FOR AIRCRAFT GYROSCOPE

BACKGROUND OF THE INVENTION

The invention relates to aircraft gyroscope systems, and in particular to means for rapidly stopping system gyroscopes when power to the gyroscope drive motors is shut off.

The gyroscopes in conventional aircraft gyroscope systems must run down freely for approximately thirty minues after power is shut off before it is safe to move the aircraft without risking damage to the gyroscopes due to random violent precession. Damage often results when the force of striking the gimbal-stops of the gyroscope is so severe that motor shafts are bent and/or bearings are damaged. Operations in the field seldom permit the luxury of waiting 30 minutes before moving the aircraft in order to insure that the gyroscope is safe from damaging violent precession. There currently exists, therefore, the need for means to provide for automatic, rapid, safe dynamic braking of aircraft gyroscopes without affecting normal gyroscope operation.

The present invention is directed toward satisfying this need.

SUMMARY OF THE INVENTION

The invention comprehends applying oppositely poled DC voltage to the three stator terminals of a gyroscope drive motor in response to the disconnection of AC power from the drive motor. The DC voltage provides electric fields that rapidly brake the gyroscope to a stop in some predetermined time interval. The preferred embodiments switch the stator windings from the AC power source to a DC power source by means of a silicon controlled rectifier (SCR) actuated relay. Timing in one embodiment is achieved by means of a unijunction transistor that fires after a given time determined by an associated RC circuit. The unijunction transistor thus delivers a pulse that starves off the SCR. Timing in an alternative embodiment is accomplished by means of a time delay relay.

It is a principal object of the invention to provide a new and improved aircraft gyroscope braking device.

It is another object of the invention to provide means that will achieve automatic, rapid, dynamic braking of aircraft gyroscopes without affecting normal gyroscope operation.

It is another object of the invention to provide improved aircraft gyroscope braking means that maintain isolation of aircraft battery and AC power circuits.

It is another object of the invention to provide improved aircraft gyroscope braking means that does not require additional pilot action to activate the braking circuits.

It is another object of the invention to provide improved aircraft gyroscope braking means having non-impact on gyroscope gyration in the event of any timing circuit malfunction.

These, together with other objects, advantages and features of the invention will become more readily apparent from the following detailed description when taken in conjunction with the illustrative embodiments in the accompanying drawings.

DETAILED DESCRIPTION OF THE PREFERRED EMBODIMENTS

Figure 1:
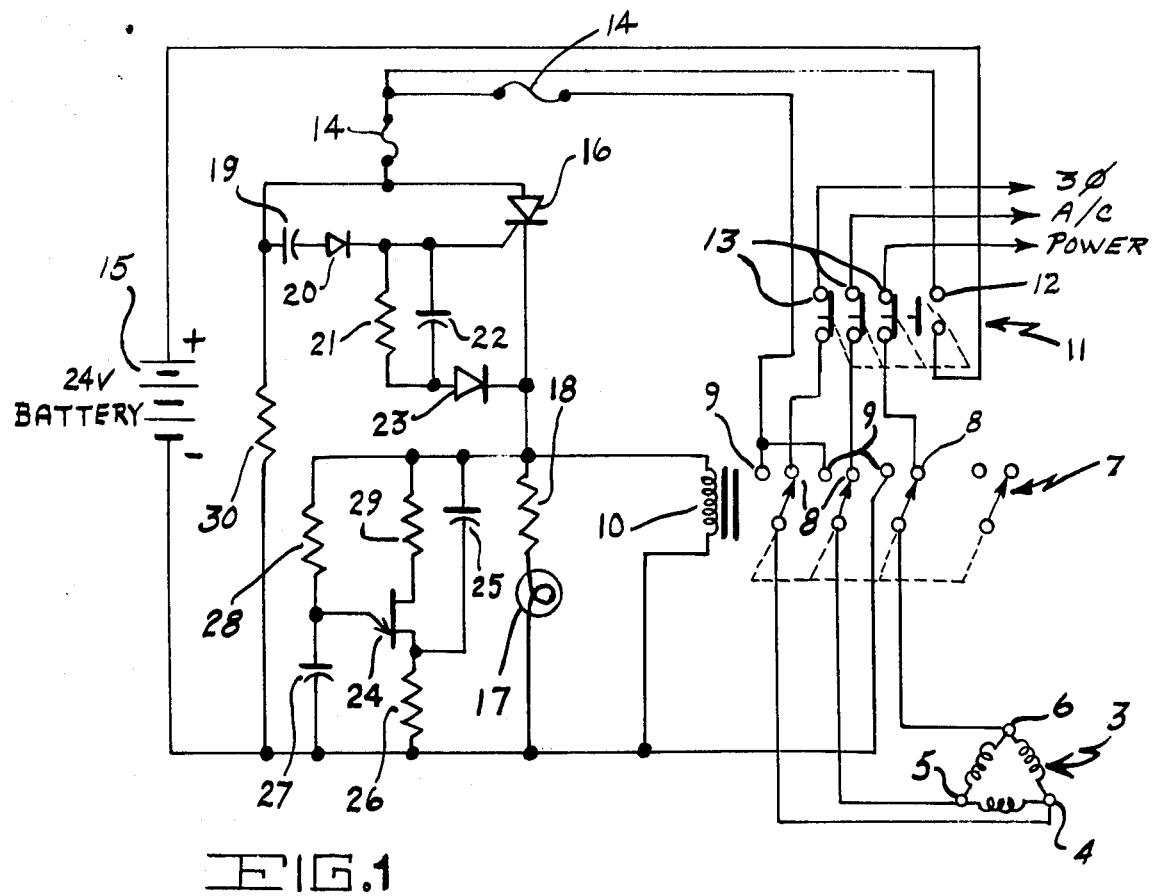
FIG. 1 is a schematic diagram of one presently preferred embodiment of the invention.

A schematic diagram of one preferred embodiment of the invention is illustrated by FIG. 1. Referring thereto, the aircraft AC power is fed to stator windings 3 of the gyroscope drive motor through contacts 13 of switch 11 and normally open contacts 8 of relay 7. DC power for braking the gyroscope drive motor is supplied from the aircraft battery 15 through contact 12 of switch 11 and through normally open contacts 9 and relay 7. Negative DC power is applied to terminal 6 and positive DC power is applied to terminals 4 and 5 of the drive motor stator. Relay 7 is activated through the circuit consisting of battery 15, contact 12 of switch 11, fuse 14, SCR 16 and relay coil 10. Lamp 17 indicates when dynamic braking is taking place. SCR 16 is fired initially through its gate circuit comprising diodes 20, 23, capacitors 19, 22, and resistor 21. The length of time which controlled rectifier 16 conducts is determined by a timing circuit consisting of unijunction transistor 24, resistors 26, 28, 29, and capacitors 25, 27.

Operation of the circuit of FIG. 1 is as follows:

After the aircraft has landed and taxied to a stop, switch 11 is functioned to remove 3θ power from the gyroscope (normal sequence). Note that switch 11 is configured with a set of contacts 12 which function opposite to the other contacts 13 of the switch (open when others are closed, etc.) Functioning of this switch also applies DC from the aircraft battery 15 to the timing circuit (comprised of the SCR 16, unijunction transistor 24, and relay 7). This DC application results in a differentiated pulse occurring at the gate of the SCR sufficient to cause it to fire. When this happens DC is applied to the unijunction timing circuit. The relay coil 10 is also energized resulting in DC current from battery 15 being applied to two terminals 4, 5 of the gyroscope motor and the third terminal 6 connected to the battery return. This causes a direct current produced magnetic field to occur in the stator windings 3 of the gyroscope. The gyroscope's spinning rotor (during rundown) interacts with the magnetic field in accordance with Lenz's Law, and dynamic braking of the gyroscope is accomplished. Time constants of the unijunction timing circuit are selected so that the relay will remain energized for approximately one minute. This is ample time for braking to remain in effect and cause the gyroscope motor to slow to a stop. When the SCR was fired, capacitor 25 is charged through resistor 26 much more rapidly than capacitor 27 can charge through resistor 28 due to its shorter constant. While battery power is applied capacitor 27 continues to charge toward the intrinsic standoff voltage of the unijunction. After approximately one minute this voltage is reached and the unijunction fires causing a positive going pulse to appear across resistor 26. Since the charge on a capacitor cannot change instantaneously, this pulse appears, through capacitor 25 onto the cathode of the SCR in sufficient amplitude and duration to cause the SCR to be starved off, and thus drop out of conduction. When this happens, the relay drops out of conduction and removes DC current from the gyroscope motor. There is now no current from the aircraft battery except that through one megohn bleader resistor 30. This slight drain is less than that caused by internal chemical action of the battery.

Figure 2:
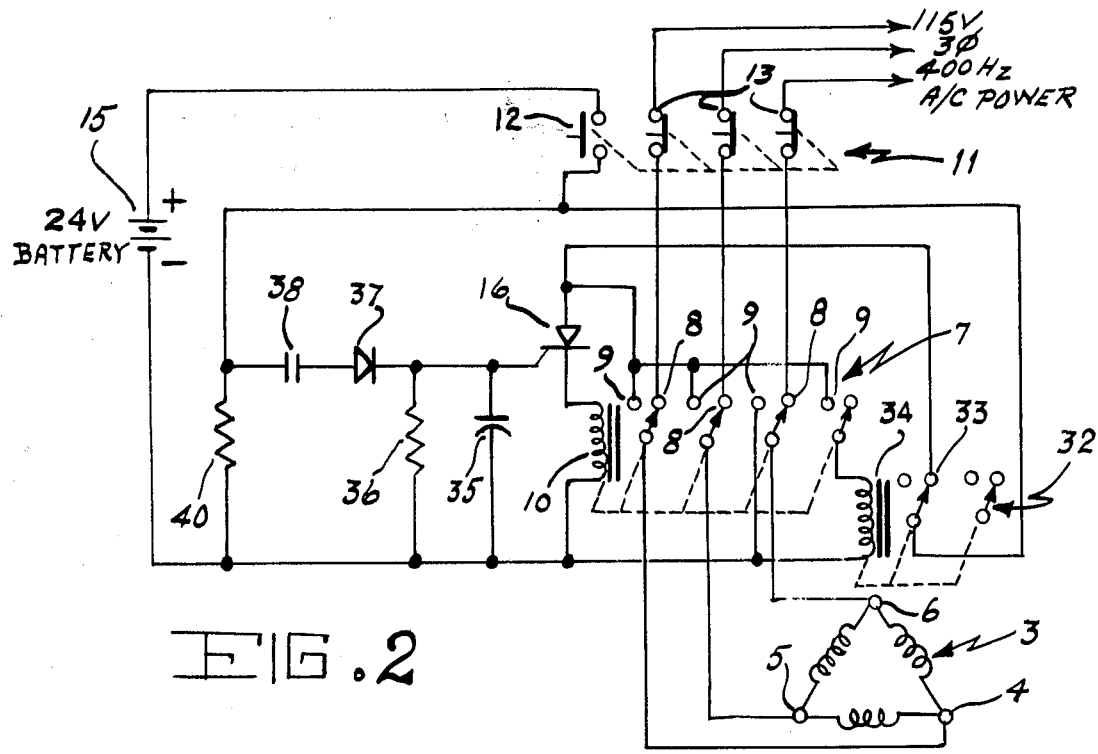
FIG. 2 is a schematic diagram of an alternate embodiment of the invention.

An alternative embodiment of the invention is illustrated by the schematic diagram of FIG. 2. Switching of AC power and DC power to and from the gyroscope drive motor terminals is accomplished in the same manner and with the same components as in the arrangement of FIG. 1. The pulse forming circuit for triggering SCR 16 consists of diode 37 and the RC combination of resistor 36 and capacitor 35. Timing for the arrangement of FIG. 2 is provided by means of time delay relay 32.

Analysis of the apparatus of the circuit of FIG. 2 is similar to that of FIG. 1. After the aircraft has landed and taxied to a stop, switch 11 is functioned to remove 3φAC power from the gyroscope drive motor stator windings 3 and apply DC from the aircraft battery 15 to the timing circuit. The timing circuit is comprised of the SCR 16 standard four-pole double throw relay 7, and time delay relay 32. Application of the DC current results in a differentiated pulse occurring at the gate of SCR 16 sufficient to cause it to begin conduction. DC current is applied to the anode circuit of the SCR through normally closed contacts 33 of time delay relay 32. When the SCR conducts, relay 7 is energized. This results in DC current from the aircraft battery 15 being applied to coil 34 of time delay relay 32 to start its timing (relay 32 delays on pull-in in an amount determined by the setting of its top mounted control). The control of relay 32 is adjusted for a delay of approximately one minute. When relay 7 is energized, DC current from the aircraft battery 15 is also applied to the gyroscope motor terminals 4, 5, 6. One potential of the battery is applied to two terminals (4, 5) of the gyroscope motor and the third terminal 6 of the gyroscope motor is connected to the other battery potential. This causes a direct current produced magnetic field to occur in the stator windings of the gyroscope drive motor. The gyroscope's spinning rotor (during rundown) interacts with the magnetic field in accordance with Lenz's Law, and dynamic braking of the gyroscope is accomplished. The approximate sitting of one minute on the control of relay 32 is ample time for application of the dynamic braking. At about this time relay 32 will time out, momentarily energize, and therefore momentarily break the circuit, through its normally closed contacts 33, to the SCR anode circuit. This will cause the SCR to drop out of conduction. Capacitor 38 becomes fully charged in a very short time after DC is applied at the functioning of switch 11 and therefore will not cause the SCR to retrigger even though the relay 32 drops back out as soon as the SCR circuit is interrupted. When the SCR is interrupted, relay 32 drops out and removes DC current from the gyroscope motor so that the aircraft battery will not be unnecessarily drained. The purpose of resistor 40 is to provide a discharge path for capacitor 38. Since resistor 40 is of high resistance, one megohm, it causes less drain to the battery than the battery's own internal chemical action. Resistor 40 is the only load on the battery, during non-braking action, caused by the above circuit.

Although not shown in FIG. 2, it is possible to connect a panel light across the coil of relay 32 in the same manner as the light 17 in FIG. 1. This light could serve as visual indication of when the SCR and relay 32 are in conduction. The panel light could thus serve as a maintenance lid.

The above circuits are not the only possible means for accomplishing the required end result, but they do fulfill certain requirements, such as isolation of aircraft battery and AC power circuits, non-impact on normal gyroscope operation in the event of timing circuit malfunction, and no requirement for additional pilot action to activate the circuit. Any other means used should also meet these criteria.

If a reasonably high battery drain (approximately 100 ma) can be tolerated during the time that aircraft is not in use, then the timing circuit could be eliminated and replaced by a simple voltage divider to energize the relay. It would then stay on until the sw is functional to apply AC power for normal gyroscope operation.

Even this continuous load would be necessary if a manual switch is used to energize and then de-energize the relay (instead of automatically accomplishing it through functioning of the switch that removes AC power from the gyroscope.)

While the invention has been described in its preferred embodiments, it is understood that the words which have been used are words of description rather than words of limitation and that changes within the purview of the appended claims may be made without departing from the scope and spirit of the invention in its broader aspects.

What is claimed is:

1. In combination with an aircraft gyroscope system having a three phase gyroscope drive motor, a three phase AC power source and a drive motor power switch for connecting and disconnecting the stator windings of said gyroscope drive motor to and from said three phase AC power source, means for automatically dynamically braking said gyroscope drive motor in response to each disconnection of said stator windings from said three phase AC power source comprising a source of DC power, and
a circuit for connecting, for a fixed period of time following each disconnection of AC power, said source of DC power to the three drive motor stator terminals, the DC power applied to two of the stator terminals being of opposite polarity to the DC power applied to the third stator terminal, said circuit comprising
a first relay having an energization coil and normally open and normally closed contacts, said drive motor stator being connected to the three phase AC power source through said normally open contacts and to said source of DC power through said normally closed contacts,
a DC power switch adapted to open when said drive motor power switch closes and to close when said drive motor power switch opens,
a second relay having an energization coil and normally open and normally closed contacts, said second relay energization coil, a normally closed contact of said first relay, a normally open contact of said second relay, and said DC power switch being connected in series between the positive and negative terminals of said source of DC power,
a silicon controlled rectifier connected in series with said first relay energization coil between the negative terminal of said source of DC power and the normally closed terminals of said first relay, and
a parallel RC timing circuit connected between the cathode gate of said silicon controlled rectifier and the negative terminal of said source of DC power.

* * * * *